United States Patent
Caroli (10) Patent No.: US 12,416,583 B2
(45) Date of Patent: Sep. 16, 2025

(54) APPARATUS FOR OPTICAL INSPECTION OF SANITARYWARE

(71) Applicant: SACMI COOPERATIVA MECCANICI IMOLA SOCIETA' COOPERATIVA, Imola (IT)

(72) Inventor: Sanzio Caroli, Imola (IT)

(73) Assignee: SACMI COOPERATIVA MECCANICI IMOLA SOCIETA' COOPERATIVA, Imola (IT)

(*) Notice: Subject to any disclaimer, the term of this patent is extended or adjusted under 35 U.S.C. 154(b) by 408 days.

(21) Appl. No.: 17/756,131

(22) PCT Filed: Nov. 18, 2020

(86) PCT No.: PCT/IB2020/060847
§ 371 (c)(1),
(2) Date: May 18, 2022

(87) PCT Pub. No.: WO2021/099949
PCT Pub. Date: May 27, 2021

(65) Prior Publication Data
US 2023/0008574 A1 Jan. 12, 2023

(30) Foreign Application Priority Data
Nov. 19, 2019 (IT) .................. 102019000021645

(51) Int. Cl.
*G01N 21/95* (2006.01)
*G01B 11/245* (2006.01)
(Continued)

(52) U.S. Cl.
CPC ....... *G01N 21/9515* (2013.01); *G01B 11/245* (2013.01); *G06T 7/0006* (2013.01);
(Continued)

(58) Field of Classification Search
CPC ....... G01N 21/9515; G01N 2021/9518; G01N 21/8806; G01B 11/245; G01B 11/022;
(Continued)

(56) References Cited

U.S. PATENT DOCUMENTS

| 5,379,347 A | 1/1995 | Kato et al. |
| 6,792,140 B2 | 9/2004 | Matusik et al. |

(Continued)

FOREIGN PATENT DOCUMENTS

| EP | 3540414 A1 | 9/2019 |
| GB | 2262339 A | 6/1993 |

(Continued)

OTHER PUBLICATIONS

International Search Report and Written Opinion for corresponding International Application No. PCT/IB2020/060847 mailed Feb. 19, 2021.

*Primary Examiner* — Neil R McLean
(74) *Attorney, Agent, or Firm* — Chrisman Gallo Tochtrop LLC (57) ABSTRACT

An apparatus for optical inspection of sanitaryware includes: a supporting device configured to receive a piece of sanitaryware to be inspected; at least one camera, configured to capture a plurality of images of the piece of sanitaryware under inspection; an automatic arm, movable between a plurality of operating positions relative to the supporting device, wherein the at least one camera is mounted on the automatic arm; a control unit, configured to receive the plurality of images, wherein the control unit is configured to process the plurality of images as a function of reference data to provide diagnostic information regarding the defectiveness of the piece of sanitaryware.

19 Claims, 6 Drawing Sheets

(51) Int. Cl.
*G06T 7/00* (2017.01)
*G06T 7/60* (2017.01)

(52) U.S. Cl.
CPC ........ *G06T 7/60* (2013.01); *G01N 2021/9518* (2013.01); *G06T 2207/30108* (2013.01)

(58) Field of Classification Search
CPC ..................... G06T 7/0006; G06T 7/60; G06T 2207/30108; G06T 2207/10028
USPC ........................................................ 382/110
See application file for complete search history.

(56) References Cited

U.S. PATENT DOCUMENTS

| | | | |
|---|---|---|---|
| 10,234,844 | B2 | 3/2019 | Tateno et al. |
| 10,887,506 | B2 | 1/2021 | Kato |
| 2003/0184740 | A1 | 10/2003 | Paradis |
| 2012/0243771 | A1* | 9/2012 | Matsumoto ........ G01N 29/0672 382/141 |
| 2014/0300729 | A1 | 10/2014 | Drescher et al. |
| 2018/0299353 | A1 | 10/2018 | Held et al. |
| 2019/0289196 | A1* | 9/2019 | Kato ....................... G05B 19/05 |
| 2020/0098122 | A1* | 3/2020 | Dal Mutto .............. G06T 17/00 |

FOREIGN PATENT DOCUMENTS

| | | | |
|---|---|---|---|
| JP | 06-184093 | A | 5/1994 |
| JP | H06148093 | A | 5/1994 |
| JP | 2003108985 | A | 4/2003 |
| JP | 2007115038 | A | 5/2007 |
| JP | 2013507026 | A | 2/2013 |
| JP | 2013250247 | A | 12/2013 |
| JP | 2015114722 | A | 6/2015 |
| JP | 2018181235 | A | 11/2018 |
| JP | 2018537671 | A | 12/2018 |
| JP | 2019158553 | A | 9/2019 |
| KR | 20180002227 | A | 1/2018 |
| WO | 2011/039679 | A1 | 4/2011 |
| WO | 2015/011782 | A1 | 1/2015 |
| WO | 2018/042399 | A1 | 3/2018 |
| WO | 2018/155590 | A1 | 8/2018 |
| WO | WO-2019130307 | A1 * | 7/2019 ......... G01N 21/8851 |
| WO | 2019/197981 | A1 | 10/2019 |

* cited by examiner

APPARATUS FOR OPTICAL INSPECTION OF SANITARYWARE

TECHNICAL FIELD

This invention relates to an apparatus and a method for optical inspection of sanitaryware.

BACKGROUND ART

This disclosure addresses the production of ceramic sanitaryware, such as, for example, toilet bowls, washbasins, washstands, bidets, urinals, bathtubs and shower trays. Sanitaryware of this kind is usually made by slip casting methods which can result in the production of defective parts. During the production process of the ceramic piece, and in particular after the steps of formation by casting, drying and at the end of the process of firing (which usually is the last step of the ceramic production process), quality inspections are run. These quality inspections are carried out in order to identify the presence of defects so as to avoid to process defective semifinished products and/or to put non-compliant parts on the market. More specifically, the quality inspection identifies parts with a low level of defectiveness, which can be reworked, and parts with a high level of defectiveness, which must be scrapped. The quality inspection may also be useful to take corrective action on the production process.

Traditionally, the quality inspection is carried out by specialist operators who check the finished parts with the naked eye after the steps of formation by casting, drying and firing, in order to identify possible formation errors, deformations, and surface irregularities, and take manual measurements with instruments such as external gauges, templates and plug gauges to identify dimensional irregularities. This quality inspection is highly time-consuming and limited in reliability, since it depends on the experience and expertise of the operator.

In the field of the manufacture of ceramic dishes, patent document US2003/0184740A1 discloses an optical inspection machine comprising an illuminator, configured to illuminate a part to be inspected with diffuse light, and a camera, located at a fixed position at an opening of the light diffuser and configured to view the part from above. This machine is not, however, suitable for inspecting objects that are more complex, such as sanitaryware, having a plurality of surfaces to be inspected. Furthermore, it is known from patent document JPH06148093A an optical inspection machine for sanitaryware comprising a robot arm; this machine has a limited efficiency of inspection.

DISCLOSURE OF THE INVENTION

The aim of this disclosure is to provide an apparatus and a method for optical inspection of sanitaryware to overcome the above mentioned drawbacks of the prior art.

This aim is fully achieved by the apparatus and method of this disclosure as characterized in the appended claims.

More specifically, this disclosure relates to an apparatus for optical inspection of sanitaryware. The sanitaryware typically includes a ceramic body which may be in the plastic state or may be dried after the processes of casting and drying; in these cases, the sanitaryware is a semifinished product. The sanitaryware may include a ceramic body with a glaze coating (after firing); in this case, the sanitaryware is a finished product. Preferably, the apparatus comprises a supporting device, configured to receive a piece of sanitaryware to be inspected at an inspection position. The apparatus comprises at least one camera, configured to capture a plurality of images of the piece of sanitaryware under inspection, located at the inspection position.

The apparatus comprises an automatic arm, movable between a plurality of operating positions relative to the supporting device (that is, relative to the piece of sanitaryware under inspection, located at the inspection position, that is, relative to a fixed reference). The at least one camera is mounted on (or associated with) the automatic arm. Preferably, the at least one camera is mounted at a free end of the automatic arm (the automatic arm extending between a first, fixed end, connectable to a flat supporting surface, and a second, free end, movable relative to the flat supporting surface. Preferably, the apparatus includes a head (or inspection head) associated with the free end of the mechanical arm. The at least one camera is preferably mounted on the inspection head.

The apparatus comprises a control unit, configured to receive the plurality of images captured by the at least one camera. The control unit has access to a database (or to a memory). In an embodiment, the database is included in the apparatus. In an embodiment, the database is remote. The database includes reference data. In an embodiment, the reference data include images of a reference piece of sanitaryware that is free of defects. In an embodiment, the reference data include standard dimensions of the reference piece of sanitaryware.

In an embodiment, the reference data include reference tolerances for the reference dimensions.

In an embodiment, the reference data relate to (or are representative of) one or more characteristic defects.

In an embodiment, the reference data include a sequence of operating positions for the automatic arm.

The control unit is configured to process the plurality of images as a function of the reference data to provide diagnostic information regarding the defectiveness of the piece of sanitaryware. For example, the control unit may be configured to compare the images captured with the reference images of the piece of sanitaryware in order to detect differences between them. The control unit may also be configured to derive real measurements from the images captured and to compare the real measurements with the standard dimension in order to detect differences between them (specifically, differences between the reference tolerances).

The control unit may also be configured to compare the images captured (or parts thereof) with images of typical defects, in order to detect the presence of defectiveness in the piece of sanitaryware inspected.

The apparatus of this disclosure is thus capable of automatically inspecting the piece of sanityaryware with a good level of reliability.

Preferably, the automatic arm includes a robot. Preferably, the automatic arm defines (or is) a robotic arm. The robotic arm has a plurality of degrees of freedom (preferably, at least five degrees of freedom or at least six degrees of freedom) to move between the plurality of operating positions. In an embodiment, the robotic arm includes a base and a head (that is, it extends between a base and a head). The base is operatively stationary. In other words, the base is configured to be fixed to a flat supporting surface. The head is operatively movable. More specifically, the head is movable relative to the base; preferably, the head is movable with (at least) five degrees of freedom.

In an embodiment, the apparatus comprises at least one illuminator, configured to illuminate the piece of sanitaryware under inspection, located at the inspection position (that is, on the supporting device).

In an embodiment, the at least one illuminator is mounted on the automatic arm. In an embodiment, the at least one illuminator is mounted on the head of the robotic arm.

In an embodiment, the control unit is configured to receive input data. The input data represent a type of sanitaryware to be inspected. The type may include a kind of sanitaryware (for example, washstand or shower tray or toilet bowl) and/or a specific model. In an embodiment, the input data may also represent a desired sanitaryware quality (for example, first choice or second choice).

In an embodiment, the control unit is configured to select the reference data from the database as a function of the input data. The control unit is configured to query the database as a function of input data in order to retrieve the reference data.

In an embodiment, the control unit is configured to drive the automatic arm through a predetermined succession of operating positions of the plurality of operating positions, as a function of the input data.

In an embodiment, the supporting device includes a rotary platform that rotates about a vertical axis of rotation. In an embodiment, the control unit is configured to drive the automatic (or robotic) arm in coordination (simultaneously) with the supporting device (that is, the rotary platform). In an embodiment, the rotary platform is configured to supportably receive the piece of sanitaryware at the inspection position. In an embodiment, at the inspection position, the piece of sanitaryware rests on the rotary platform.

In an embodiment, in which the supporting device includes the rotary platform, the control unit is configured to drive the supporting device in rotation as a function of the input data. More specifically, the control unit is configured to drive the automatic arm and the supporting device in coordination (simultaneously) as a function of the input data.

In an embodiment, the apparatus comprises a plurality of cameras, configured to capture the plurality of images. Thus, in an embodiment, the at least one camera includes a plurality of cameras. In an embodiment, the plurality of cameras is associated with the automatic arm. In an embodiment, the plurality of cameras is mounted on the head of the robotic arm.

Preferably, the viewing axes of the cameras of the plurality (or of some of them) are incident. More specifically, the viewing axes of the cameras of the plurality (or of some of them) are convergent at a single point (inspection point).

In an embodiment, the plurality of cameras includes a first group of cameras, configured to capture first images (or scans) of the piece of sanitaryware. Preferably, the cameras of the first group are connected to each other in a stereo configuration to capture three-dimensional images. More specifically, the cameras of the first group of cameras define 3D scanners. Thus, the first images are preferably three-dimensional images.

Hereinafter, reference is made to the embodiment in which the first images are three-dimensional, without thereby limiting the disclosure to this embodiment; indeed, it should be noted that in other embodiments, the first images (or some of them) are two-dimensional.

In an embodiment, the plurality of cameras includes a second group of cameras, configured to capture second images of the piece of sanitaryware. In an embodiment, the second images are two-dimensional. Hereinafter, reference is made to the embodiment in which the second images are two-dimensional, without thereby limiting the disclosure to this embodiment; indeed, it should be noted that in other embodiments, the second images (or some of them) are three-dimensional.

In an embodiment, the cameras of the first group of cameras may coincide with the cameras of the second group of cameras; more specifically, the same cameras capture the two-dimensional images and, when connected in a stereo configuration, they capture the three-dimensional images.

In an embodiment, the apparatus comprises a plurality of illuminators, configured to illuminate the piece of sanitaryware under inspection. In an embodiment, the plurality of illuminators is associated with the automatic arm. In an embodiment, the plurality of illuminators is mounted on the head of the robotic arm.

Preferably, the illuminating directions of the illuminators of the plurality (or of some of them) are incident. More specifically, the illuminating directions of the illuminators of the plurality (or of some of them) are convergent at a single point (preferably the inspection point).

In an embodiment, the plurality of illuminators includes a central illuminator and a plurality of lateral illuminators disposed laterally of the central illuminator. More specifically, the plurality of illuminators includes a first and a second group of lateral illuminators disposed on opposite sides of the head with respect to the central illuminator. In an embodiment, the first and second groups of illuminators are symmetrical about an axis passing through the central illuminator. In an embodiment, the first and second groups of illuminators each include at least one illuminator. In an embodiment, the first and second groups of illuminators each include at least two illuminators. In an embodiment, the first and second groups of illuminators each include at least three illuminators.

In an embodiment, the cameras of the second group of cameras are positioned around the central illuminator. In an embodiment, the cameras of the second group of cameras are interposed between the first and the second group of lateral illuminators. More specifically, the second group of cameras includes four cameras, disposed symmetrically around the central illuminator.

In an embodiment, the cameras of the first group are disposed on opposite sides of the head, on the outside of the lateral illuminators. More specifically, the cameras of the first group include at least a first camera and at least a second camera (in one embodiment, at least a first pair of cameras and at least a second pair of cameras). Thus, the first and second groups of lateral illuminators are interposed between the cameras of the first group of cameras. More specifically, the first group of lateral illuminators is interposed between the central illuminator and the first camera (or the first pair of cameras) of the first group of cameras; the second group of lateral illuminators is interposed between the central illuminator and the second camera (or the second pair of cameras) of the first group of cameras.

In an embodiment, the plurality of illuminators includes a structured illuminator, configured to project structured light on the piece of sanitaryware under inspection. More specifically, the structured illuminator may be defined by a screen configured to display a predetermined pattern (for example, a lined pattern). The screen is provided with backlighting. Thus, the structured illuminator is configured to project the predetermined pattern on the surface of the piece of sanitaryware under inspection.

In an embodiment, the cameras of the plurality of cameras include one or more cameras (in the first and/or in the second group or in a further group) configured to detect the light reflected by the surface of the piece of sanitaryware (this light being projected on the surface of the piece of sanitaryware by the structured illuminator, that is, by the screen), in order to detect surface reflectivity defects by deflectometry analysis.

In an embodiment, the control unit is configured to selectively enable one or more illuminators of the plurality of illuminators, as a function of the input data and/or of the three-dimensional images. In another embodiment, the illuminators remain enabled for the entire duration of the inspection.

In an embodiment, the control unit is configured to enable the first group of cameras to capture three-dimensional images of the piece of sanitaryware and to then process the three-dimensional images. In an embodiment, the control unit is configured to selectively enable one or more cameras of the second group of cameras and/or one or more illuminators of the plurality of illuminators in a predetermined sequence, as a function of the input data and/or of the three-dimensional images. The control unit is configured to drive a movement of the robotic arm through a succession of predetermined operating positions, as a function of the input data and/or of the three-dimensional images. More specifically, the control unit is configured to selectively enable one or more cameras of the second group of cameras and/or one or more illuminators of the plurality of illuminators in a predetermined sequence, coordinated with the movement of the robotic arm, in such a way that, for each operating position at which the robotic arm is positioned, one or more cameras and/or one or more illuminators are enabled to capture at least one image of the surface of the piece of sanitaryware. Preferably, the control unit selects the operating positions to which the robotic arm is driven (hence, where the one or more illuminators and the one or more cameras are enabled) as a function of the input data (including the type of sanitaryware to be inspected and/or the inspection settings selected by the user). Preferably, the control unit selects the operating positions to which the robotic arm is driven (hence, where the one or more illuminators and the one or more cameras are enabled) as a function of the three-dimensional images captured by the first group of cameras. In effect, these three-dimensional images indicate the type of sanitaryware; the control unit may also be configured to identify, in the three-dimensional images, one or more critical zones of the piece of sanitaryware (or of its surface) where further (more in-depth) analyses are recommended. In effect, the cameras of the second group of cameras preferably have a higher resolution than the cameras of the first group of cameras.

In an embodiment, the apparatus comprises an emitter (at least one). In one embodiment, the emitter is a microphone (and thus is configured to emit an acoustic wave). In an embodiment, the emitter is an accelerometer. In an embodiment, the emitter is associated with the automatic arm (in particular, it is mounted on the head of the robotic arm).

In another embodiment, the emitter is separate from the automatic arm.

The emitter is configured to emit a wave (for example, an acoustic wave) directed at the piece of sanitaryware under inspection.

In an embodiment, the apparatus comprises a sensor configured to receive a reflected wave from the piece of sanitaryware (or from the surface of it) and to generate a signal representing a reflection of the wave on the piece of sanitaryware under inspection. The control unit is configured to receive a signal representing a reflection of the wave on the piece of sanitaryware under inspection and to process the signal representing the reflection of the wave, in order to provide the diagnostic information. More specifically, the reflection of the acoustic wave is useful for detecting defects such as breakages and small cracks (difficult to detect with the naked eye or with cameras).

In an embodiment, the plurality of cameras includes at least one retractable camera, movable between a retracted position, where it is housed in the head of the robotic arm, and an extracted position, where it projects from the head of the robotic arm. The at least one retractable camera is particularly suitable for inspecting hidden zones of the piece of sanitaryware—for example, under the rim. In an embodiment, the control unit is configured to coordinate the movement of the robotic arm with the movement of the at least one retractable camera between the retracted position and the extracted position, as a function of the input data and/or of the images captured by the first group of cameras. In an embodiment, the control unit is configured to issue an instruction to extract the retractable camera, as a function of the input data and/or of the three-dimensional images.

In an embodiment, the control unit is configured to generate a three-dimensional rendering of the piece of sanitaryware under inspection as a function of (that is to say, from) the plurality of images captured.

In an embodiment, the reference data include a plurality of reference (or standard) dimensions for the piece of sanitaryware under inspection. In an embodiment, the diagnostic information includes (diagnostic) information relating to dimensional defectiveness. In an embodiment, the control unit is configured to derive a plurality of real dimensions of the piece of sanitaryware under inspection from the three-dimensional rendering and/or from the plurality of images captured.

For example, the real dimensions (and the corresponding reference dimensions) for a toilet pan may include one or more of the following dimensions: height, width, depth of rim, depth of foot, position of seat fastening holes, height of water inlet hole axis from the floor. For the supporting column of a washstand, the real dimensions (and the corresponding reference dimensions) may include one or more of the following dimensions: height, width of base, depth of base, width of the zone where the washbowl is coupled.

In an embodiment, the control unit is configured to compare the plurality of real dimensions with corresponding reference dimensions of the plurality of reference dimensions.

In an embodiment, the control unit is configured to derive the information relating to dimensional defectiveness as a function of a difference between the real dimensions and the reference dimensions.

In an embodiment, the reference data include, for the plurality of reference dimensions, a corresponding plurality of dimensional tolerances. In particular, for dimensions of parts which are not visible in use, higher tolerances are accepted. In an embodiment, the dimensional tolerances are selectable by a user based on a desired quality for the sanitaryware (for example, first choice or second choice). In light of this, the control unit is configured to flag a piece of sanitaryware as defective if the difference between a real dimension (or measurement) and the corresponding reference dimension (or measurement) is greater than the corresponding tolerance.

The information relating to the dimensional defectiveness represents the presence or absence of one or more of the following defects: misshaping, imperfect flatness of a flat surface of the piece of sanitaryware, imperfect perpendicularity between orthogonal flat surfaces of the piece of sanitaryware, warpage (or lack of symmetry), imperfect straightness of an edge of the piece of sanitaryware.

In an embodiment, the reference data include a reference model. The reference model may represent a reference piece of sanityaryware free of defects and/or defective pieces of sanitaryware.

In an embodiment, the reference data include, for the plurality of images captured, a corresponding plurality of reference images representing a reference piece of sanitaryware that is free of defects. The plurality of reference images constitutes a possible example of the reference model.

In an embodiment, the reference data include a three-dimensional rendering of the reference piece of sanitaryware (free of defects); this three-dimensional rendering constitutes a further example of the reference model.

In an embodiment, the diagnostic information includes (diagnostic) information relating to surface defectiveness.

In an embodiment, the control unit is configured to compare the captured images with the reference model, specifically with the corresponding reference images of the plurality of reference images, and/or to compare the three-dimensional rendering of the piece of sanitaryware under inspection (derived by the control unit) with the three-dimensional rendering of the reference piece of sanitaryware.

In an embodiment, the control unit is configured to derive the information relating to surface defectiveness as a function of the comparison between the captured images and the corresponding reference images.

In an embodiment, the information relating to surface defectiveness are representative of (or indicate) a presence or absence of forming defects, deformations or surface finish of the piece (in the case of a semifinished product in the plastic state and/or dried) and/or (in the case of a finished product) of one or more of the following surface defects (or types of surface defects) on a surface of the sanitaryware: pinholes, mottling, specks, clumps, blisters, bloating, blemishes, colour defects, poor finish, cracks, crawling.

More specifically, the surface defects may affect the ceramic body and/or the glaze of the sanitaryware. Still more specifically: the information relating to the surface defectiveness are representative of (that is, indicate) a presence or absence of one or more of the following surface defects (or types of surface defects) on a surface of the sanitaryware: roughness, bubbles (or blisters), pitting, crazing (that is, small cracks between 50 and 100 microns in size in the glaze), crawling (cracks in ceramic body and glaze between 50 and 100 microns in size), cracks, surface warpage (collapsed parts of the surface), heavy glaze (that is, parts where there is more glaze than necessary, compared to the reference surface), popping (that is, discontinuity in the glaze taking the form of a small pit between 0.5 and 1 mm in size, bubbles (that is, excessive surface roughness), blemishes (that is, zones where the colour differs from that of the rest of the surface, light glaze (that is, not enough glaze to prevent the ceramic body from being exposed), glaze shrinkage (that is, zones where the glaze has shrunk during firing, exposing the ceramic body), logo absent or defective, poor finish (for example, humps or ridges or burrs), eggshell (that is, unusual roughness of glaze surface similar to that of an eggshell), orange peel (unusual roughness of glaze surface produces an orange peel effect), glaze waviness, peeling (that is, glaze breaks off in flakes), dull glaze.

In an embodiment, the reference data include a tolerance for each defect (or type of defect). In an embodiment, the reference data include a tolerance for each surface of the piece of sanitaryware and for each defect (or type of defect). For example, for each surface of the piece of sanitaryware, the reference data may include a respective classification into visible, half-visible or hidden surface (indicating whether the surface is visible to view, half-visible or hidden from view when the piece of sanitaryware is in use); thus, for each type of defect, the reference data may include a first tolerance where the surface is visible, a second tolerance where the surface is half-visible and a third tolerance where the surface is hidden. Typically, wide tolerances are accepted for a hidden surface, whereas tight tolerances are applied to a visible surface.

In an embodiment, the control unit is configured to receive an identification code to identify the piece of sanitaryware. More specifically, the control unit may be configured to read, with the at least one camera, an identification code applied on the piece of sanitaryware (for example, a barcode or a QR code). In an embodiment, the control unit is configured to receive the identification code of the piece of sanitaryware from a user. In an embodiment, the control unit is configured to assign a sequence identification code to every piece of sanitaryware to be inspected.

In an embodiment, the control unit is configured to generate a report document containing the diagnostic information associated with the identification code of the piece of sanitaryware.

In an embodiment, the apparatus comprises a vacuum seal test device.

The vacuum seal test device is configured to create a vacuum in one or more internal spaces in the piece of sanitaryware and to measure the (negative) pressure in the one or more internal spaces. During the vacuum seal test, any openings such as, for example, a water drain outlet or a water supply inlet or a bowl are sealed. The vacuum seal test is useful to detect hidden defects in the internal spaces.

In an embodiment, the apparatus comprises an additional automatic arm. In an embodiment, the additional automatic arm defines an additional robotic arm (having, preferably, at least 5 degrees of freedom). In an embodiment, the additional automatic arm is configured to position the piece of sanitaryware under inspection at the inspection position on the supporting device and to remove the piece of sanitaryware from the inspection position. More specifically, the additional automatic arm is configured to lift the piece of sanitaryware from a flat supporting feed surface, move it and place it on the rotary platform and then to lift it from the rotary platform, move it and put back on the flat supporting feed surface.

In an embodiment, the control unit is programmed to drive the automatic arm and the additional automatic arm in coordination with each other.

In an embodiment, the at least one camera is configured to capture at least one image of the piece of sanitaryware under inspection while it is being lifted by the additional mechanical arm, so as to also inspect the surfaces of the sanitaryware that remain hidden when it is at the inspection position.

This disclosure also provides a method for optical inspection of sanitaryware.

The method comprises a step of receiving a piece of sanitaryware to be inspected on a supporting device, at an inspection position.

The method comprises a step of moving an automatic arm between a plurality of operating positions. In an embodiment, the step of moving is carried out with at least five degrees of freedom of the automatic arm (the automatic arm defining a robotic arm).

The method comprises a step of capturing a plurality of images of the piece of sanitaryware under inspection by means of at least one camera, the at least one camera being associated with the automatic arm (the at least one camera being mounted on the head of the robotic arm).

The method comprises a step of processing the plurality of images as a function of reference data to provide diagnostic information regarding the defectiveness of the piece of sanitaryware.

In an embodiment, the method comprises a step of illuminating the piece of sanitaryware located at the inspection position, using at least one illuminator mounted on the head of the robotic arm.

In an embodiment, the step of capturing includes a first sub-step of capturing first images of the piece of sanitaryware (in an embodiment, the first images are three-dimensional images captured using 3D cameras or scanners). In an embodiment, the step of capturing includes a second sub-step of capturing second images of one or more critical zones of the piece of sanitaryware (in an embodiment, the second images are two-dimensional images captured using traditional cameras).

In an embodiment, the method comprises a step of processing the three-dimensional images captured during the first sub-step, in order to identify the one or more critical zones of the piece of sanitaryware. Thus, the first sub-step is useful for identifying critical zones which might have defects in them and the second sub-step focuses on these critical zones. In effect, the images captured during the second sub-step are more detailed (because they concentrate on smaller zones and/or because they are captured using cameras with a higher resolution) than the images captured during the first sub-step.

In an embodiment, the method comprises a step of supportably receiving the piece of sanitaryware at an inspection position on a rotary platform of the supporting device. In an embodiment, the method comprises a step of rotating the rotary platform of the supporting device about a vertical axis.

Preferably, the step of rotating is coordinated with the step of moving the automatic arm.

In an embodiment, at least one image is captured at each operating position of the plurality of operating positions at which the automatic arm is positioned.

In an embodiment, the method comprises a step of enabling a first group of cameras to capture first images of the piece of sanitaryware. In an embodiment, the first images are 3D images.

In an embodiment, the method comprises a step of processing the first images and a step of selectively enabling one or more cameras of a second group of cameras as a function of the first images. In an embodiment, the method also comprises a step of enabling one or more illuminators of the plurality of illuminators at the same time as the first and/or the second group of cameras are enabled. In an embodiment, the method comprises a step of driving the automatic (or robotic) arm as a function of the first images (in coordination with the enabling of the cameras and/or of the illuminators).

In an embodiment, the method comprises a step of extracting a retractable camera, movable between a retracted position, where it is housed in the head of the robotic arm, and an extracted position, where it projects from the head of the robotic arm. Preferably, the step of extracting is coordinated with the step of moving the robotic arm. That way, it is possible to inspect hidden zones of the piece of sanitaryware, such as, for example, the zone under the rim.

In an embodiment, the method comprises a step of projecting structured light on the piece of sanitaryware under inspection, using (at least one) structured illuminator.

In an embodiment, the method comprises a step of emitting a wave (an acoustic wave, for example) directed at the piece of sanitaryware under inspection and a step of capturing the wave reflected by the surface of the piece of sanitaryware. The method then comprises a step of processing a signal representing the reflected wave (or the reflection of the wave) in order to provide the diagnostic information.

In an embodiment, the method comprises a step of generating a three-dimensional (digital) rendering of the piece of sanitaryware under inspection, as a function of the plurality of images captured.

In an embodiment, the method comprises a step of deriving a plurality of real dimensions of the piece of sanitaryware under inspection from the three-dimensional rendering.

In an embodiment, the method comprises a step of comparing the plurality of real dimensions with corresponding reference dimensions of the plurality of reference dimensions and a step of deriving diagnostic information relating to dimensional defectiveness as a function of a difference between the real dimensions and the reference dimensions.

In an embodiment, the method comprises a step of comparing one or more images of the plurality of captured images with corresponding reference images to derive information relating to the surface defectiveness as a function of the comparison between the captured images and the corresponding reference images.

In an embodiment, the method comprises a step of receiving in the control unit input data representing a type of sanitaryware. In an embodiment, the method comprises a step of querying a database as a function of the input data in order to retrieve the reference data.

In an embodiment, the automatic arm is driven through a predetermined succession of operating positions of the plurality of operating positions, as a function of the input data.

In an embodiment, the method comprises a step of receiving in the control unit an identification code of the piece of sanitaryware. In an embodiment, the method comprises a step of generating a report document including the diagnostic information. Preferably, the report document associates the diagnostic information with the identification code of the piece of sanitaryware.

BRIEF DESCRIPTION OF DRAWINGS

These and other features will become more apparent from the following detailed description of a preferred embodiment, illustrated by way of non-limiting example in the accompanying drawings, in which.

DETAILED DESCRIPTION OF PREFERRED EMBODIMENTS OF THE INVENTION

With reference to the accompanying drawings, the numeral 1 denotes an apparatus for optical inspection of sanitaryware.

The apparatus 1 comprises a supporting device 2, configured to receive a piece of sanitaryware 6 at an inspection position. The supporting device 2 includes a base 21. The base 21 is configured to be fixed to a flat supporting surface (or floor T). Thus, the base 21 is operatively fixed relative to the floor T. The supporting device 2 includes a platform 22, configured to supportably receive the piece of sanitaryware 6. The platform 22 is rotatably (or turnably) coupled to the base 21 to rotate relative thereto about an axis of rotation A2. The axis of rotation A2 is vertical (parallel to the weight force). The supporting device 2 includes a rotation actuator 23 configured to rotate the platform 22 relative to the base 21.

The apparatus 1 comprises a robotic arm 3. The robotic arm 3 includes a base 31. The base 31 is configured to be fixed to a flat supporting surface (or floor T). Thus, the base 31 is operatively fixed relative to the floor T. The robotic arm 3 includes a rotary element 32. The rotary element 32 is rotatably (or turnably) coupled to the base 31 to rotate relative thereto about a first axis of rotation A32. More specifically, the rotary element 32 is configured to rotate all the way round the first axis of rotation A32 (360° rotation). In an embodiment, the rotary element 32 is configured to rotate about the first axis of rotation A32 in a first rotation direction and in a second rotation direction, opposite to the first.

The first axis of rotation A32 is vertical (parallel to the weight force). The robotic arm 3 includes a first rotation actuator 371 configured to rotate the rotary element 32 relative to the base 31. The rotation of the rotary element 32 relative to the base 31 defines a first degree of freedom of the robotic arm 3.

The robotic arm 3 includes a first limb 33. The first limb 33 is pivotally (or rotatably) coupled to the rotary element 32. The first limb 33 is configured to rotate about a second axis of rotation A33 relative to the rotary element 32. The second axis of rotation A33 is horizontal (at right angles to the weight force). The second axis of rotation A33 is rotatable (in a horizontal plane of rotation) together with the rotary element 33. The robotic arm 3 includes a second rotation actuator 372 configured to rotate the first limb 33 relative to the rotary element 32. The rotation of the first limb 33 relative to the rotary element 32 defines a second degree of freedom of the robotic arm 3.

The robotic arm 3 includes a second limb 34. The second limb 34 is pivotally (or rotatably) coupled to the first limb 33. The second limb 34 is configured to rotate about a third axis of rotation A34 relative to the first limb 33. The third axis of rotation A34 is horizontal (at right angles to the weight force). The third axis of rotation A34 is rotatable in horizontal planes, together with the rotation of the rotary element 32 and is translatable between different horizontal planes through the movement of the first limb 33. The robotic arm 3 includes a third rotation actuator 373 configured to rotate the second limb 34 relative to the first limb 33. The rotation of the second limb 34 relative to the first limb 33 defines a third degree of freedom of the robotic arm 3.

The robotic arm 3 includes a pre-head 35. The pre-head 35 is pivotally (or rotatably) coupled to the second limb 34. The pre-head 35 is configured to rotate about a fourth axis of rotation A35 relative to the second limb 34. The fourth axis of rotation A35 is horizontal (at right angles to the weight force). The fourth axis of rotation A35 is rotatable in horizontal planes, together with the rotation of the rotary element 32 and is also translatable between different horizontal planes through the movement of the first limb 33 and of the second limb 34. The robotic arm 3 includes a fourth rotation actuator 374 configured to rotate the pre-head 35 relative to the second limb 34. The rotation of the pre-head 35 relative to the second limb 34 defines a fourth degree of freedom of the robotic arm 3.

The robotic arm 3 includes a head 36. The head 36 is rotatably (or turnably) coupled to the pre-head 35. The head 36 is rotatable about a fifth axis of rotation A36. In an embodiment, the head 36 is configured to rotate all the way round the fifth axis of rotation A36 (360° rotation). In an embodiment, the head 36 is configured to rotate about the fifth axis of rotation A36 in a first rotation direction and in a second rotation direction, opposite to the first. The robotic arm 3 includes a fifth rotation actuator 375 configured to rotate the head 36 relative to the pre-head 35. The rotation of the head 36 relative to the pre-head 35 defines a fifth degree of freedom of the robotic arm 3.

In one embodiment, the first, second, third, fourth and fifth rotation actuators 371, 372, 373, 374 and 375 and the actuator 23 of the platform are pneumatic actuators and, in another embodiment, they are hydraulic actuators.

The robotic arm 3 is movable between a plurality of operating positions (or configurations) through the first, second, third, fourth and fifth rotation actuators 371, 372, 373, 374 and 375. More specifically, at each of the plurality of operating positions, the head 36 is directed towards the piece of sanitaryware located at the inspection position in order to view the piece of sanitaryware 6. The robotic arm 3 is also movable between a plurality of non-operating positions, where the head 36 is not directed towards the piece of sanitaryware 6 located at the inspection position, in order to allow the piece of sanitaryware 6 to be placed at the inspection position (without interfering with it) or to perform tests or maintenance on the robotic arm 3.

Figure 1:
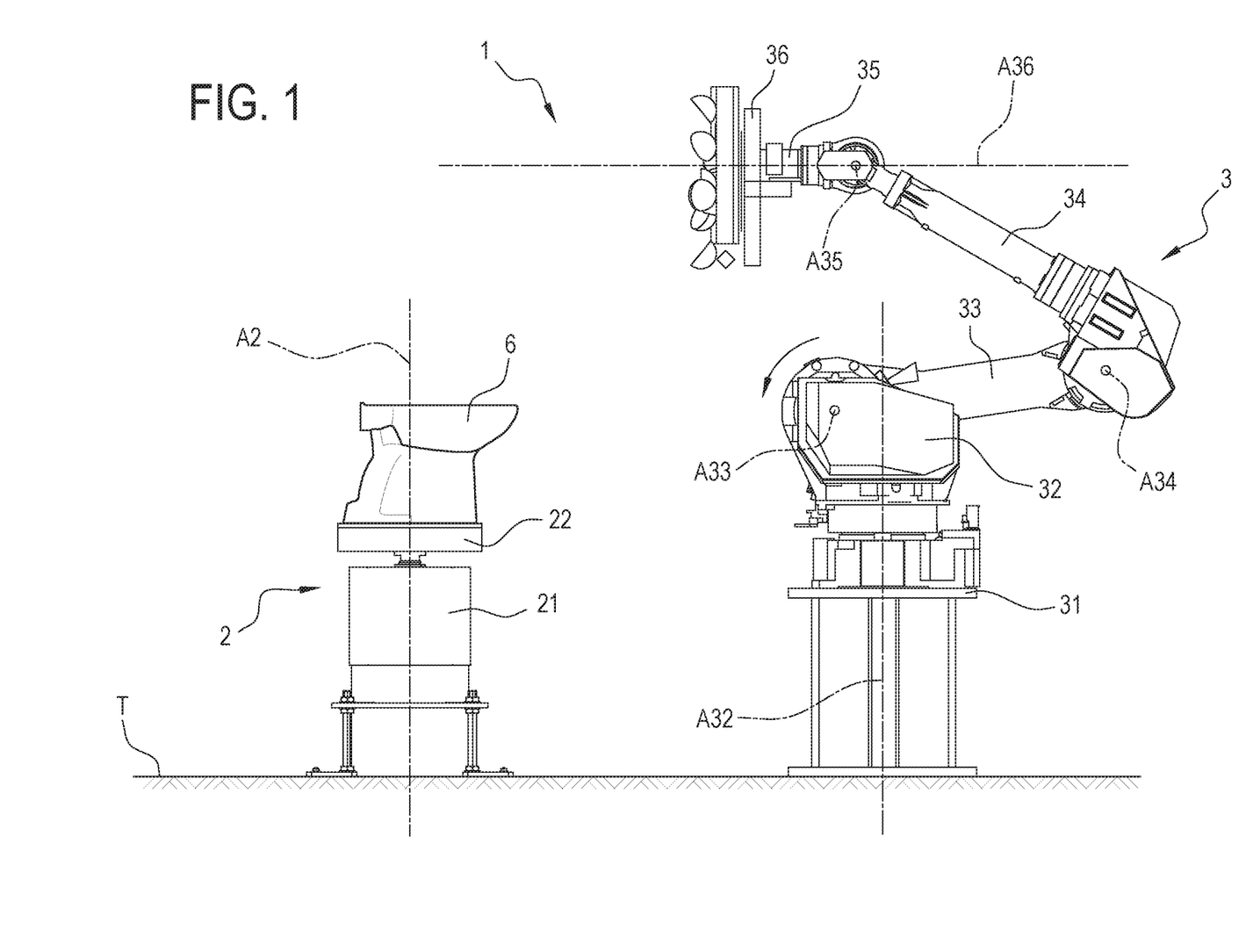
FIGS. 1 and 2 are side views illustrating an apparatus for optical inspection of sanitaryware according to this disclosure at a rest position and at an extended position, respectively.
Figure 2:
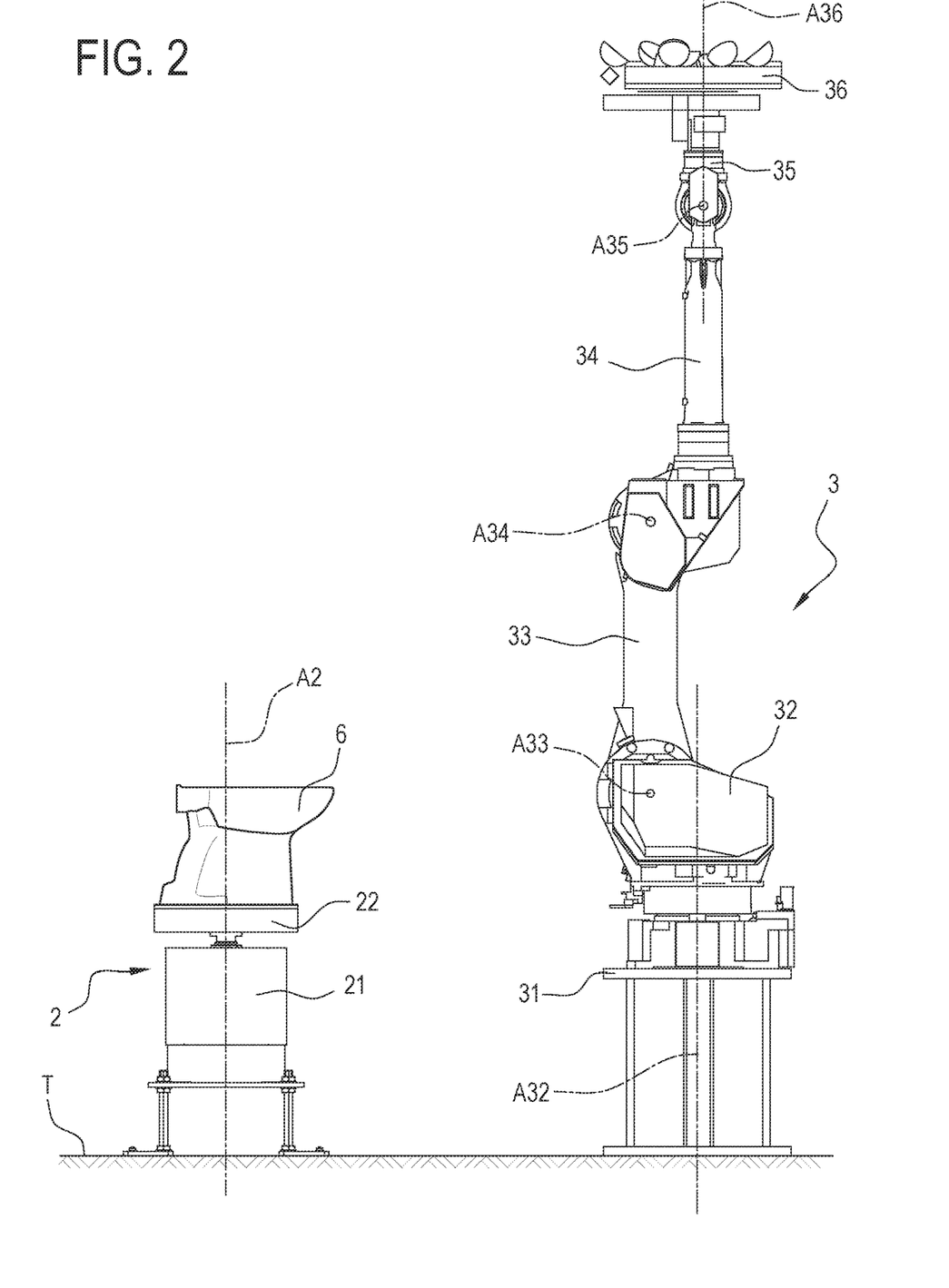
Figure 3:
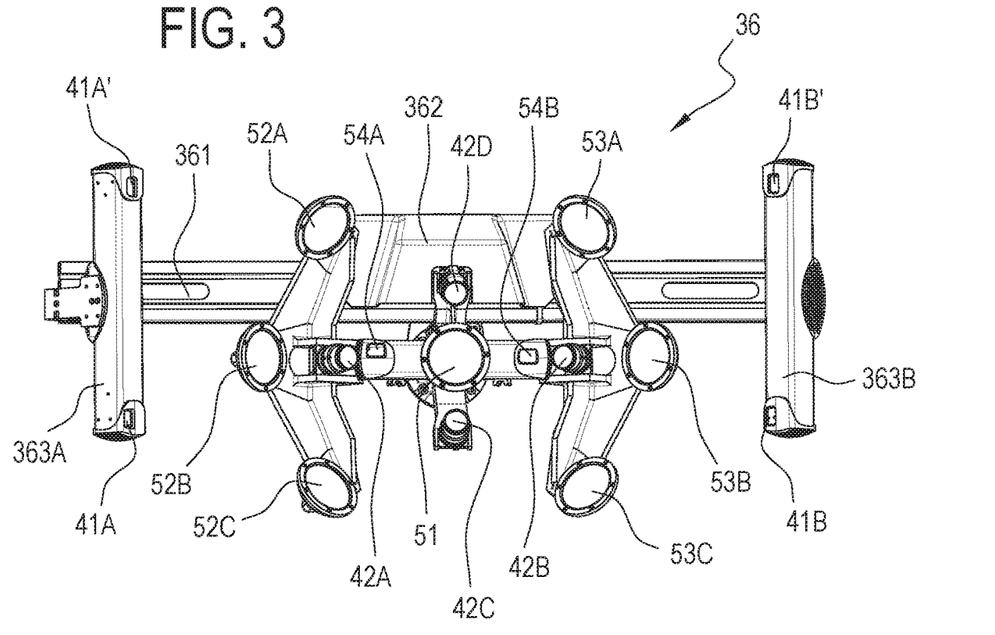
FIGS. 3 and 4 illustrate a head of the robotic arm in an embodiment of the apparatus of FIG. 1 in a front view and in a perspective view.
Figure 4:
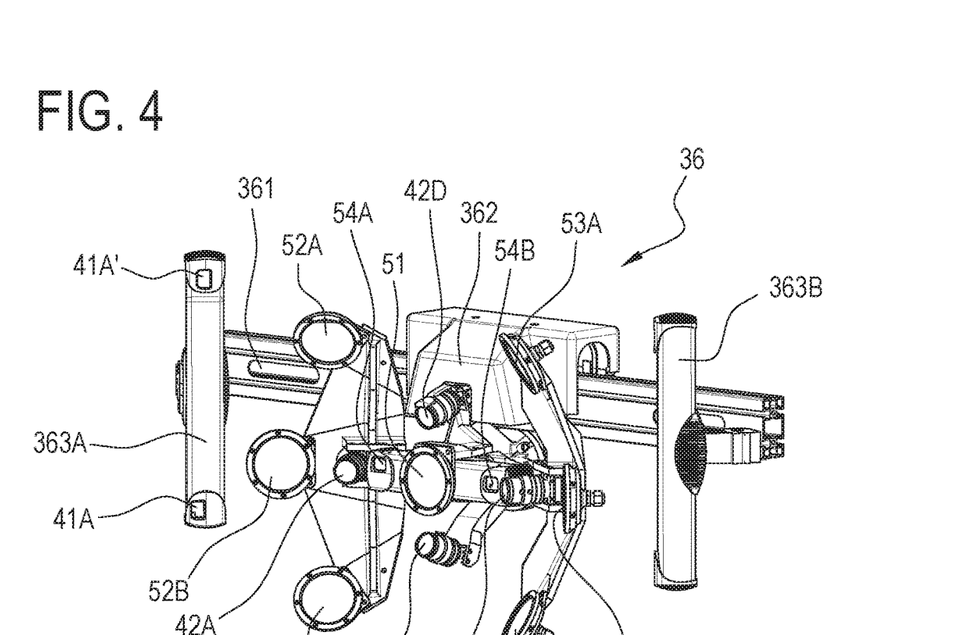
Figure 5:
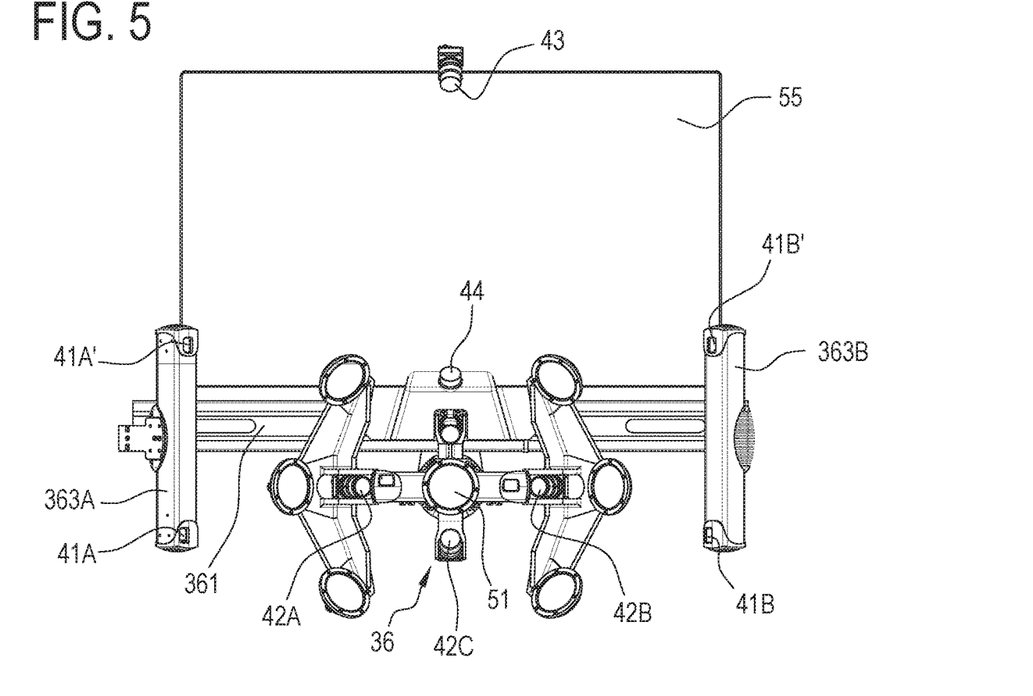
FIGS. 5 and 6 illustrate a head of the robotic arm in another embodiment of the apparatus of FIG. 1 in a front view and in a perspective view.
Figure 6:
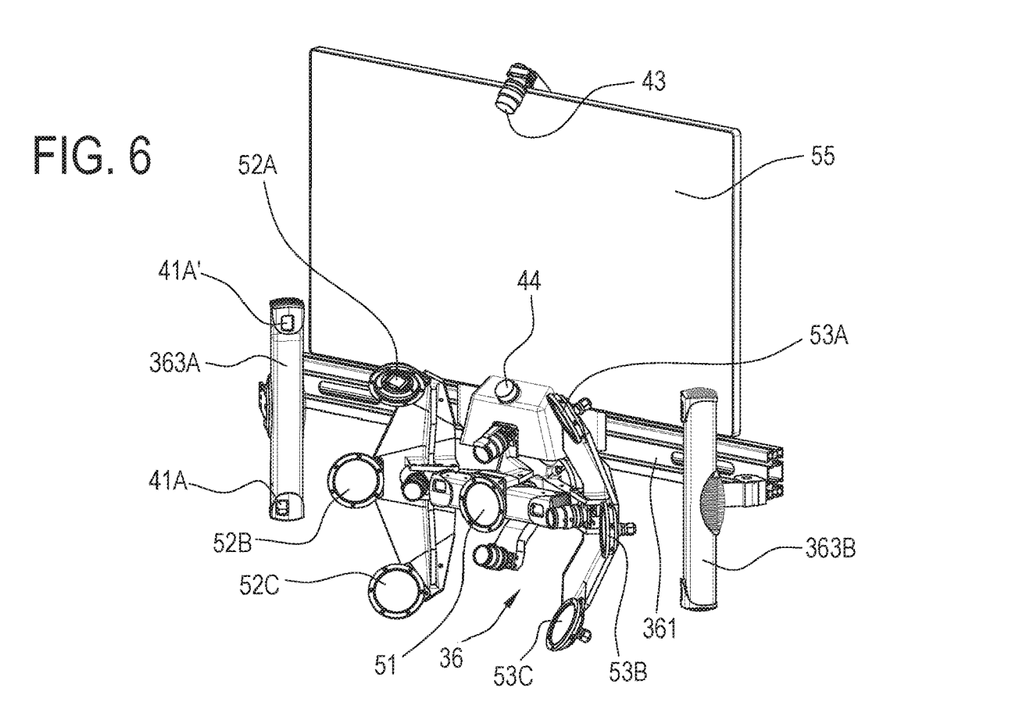

By way of non-limiting example, FIG. 1 shows the robotic arm 3 at a first non-operating position (rest configuration) and FIG. 2 shows the robotic arm 3 at a second non-operating position (extended configuration).

The head 36 includes a supporting bar 361. The supporting bar 361 is rotatable relative to the pre-head 35.

The head 36 includes a supporting device 362 connected to the supporting bar 361. In an embodiment, the supporting device 362 is slidable (or translatable) along the supporting bar 361. In an embodiment, the head 36 includes an end actuator to make the supporting device 362 slide along the supporting bar 361. The translation of the supporting device 362 along the supporting bar 361, where possible, defines a sixth degree of freedom of the robotic arm 3.

The head 36 includes a first lateral supporting device 363A, connected to a first end of the supporting bar 361. The head 36 includes a second lateral supporting device 363B, connected to a second end of the supporting bar 361, where the second end is opposite to the first end. The first and the second lateral supporting devices 363A and 363B are elongate at right angles to the supporting bar 361.

The apparatus 1 includes a plurality of cameras.

More specifically, the apparatus 1 includes a first group of cameras. In an embodiment, the cameras of the first group are 3D cameras (or 3D scanners).

The first group of cameras includes a first camera 41A mounted on the first lateral supporting device 363A. In an embodiment, the first group of cameras includes a first pair of cameras 41A, 41A' mounted on the first lateral supporting device 363A (at opposite ends of the first lateral supporting device 363A). The first group of cameras includes a second camera 41B mounted on the second lateral supporting device 363B. In an embodiment, the first group of cameras includes a second pair of cameras 41B, 41B' mounted on the second lateral supporting device 363B (at opposite ends of the second lateral supporting device 363B).

The apparatus 1 includes a second group of cameras. In an embodiment, the cameras of the second group are 2D cameras. The second group of cameras includes a first camera 42A. In an embodiment, the second group of cameras includes a second camera 42B. In an embodiment, the second group of cameras includes a third camera 42C. In an embodiment, the second group of cameras includes a fourth camera 42D. Preferably, the cameras 42A, 42B, 42C and 42D of the second group are connected to the central supporting device 362. Preferably, the cameras 42A, 42B, 42C and 42D of the second group are connected to the central supporting device 362.

The apparatus 1 includes a plurality of illuminators. The plurality of illuminators includes a central illuminator 51. The central illuminator 51 is located at the centre of the cross (at whose ends the cameras 42A, 42B, 42C and 42D are located). The plurality of illuminators includes a first group of lateral illuminators, in turn including three illuminators 52A, 52B, 52C. The plurality of illuminators includes a second group of lateral illuminators, in turn including three illuminators 53A, 53B, 53C. The first group of lateral illuminators 52A, 52B, 52C is interposed between the first camera 42A of the second group and the first camera 41A of the first group. The second group of lateral illuminators 53A, 53B, 53C is interposed between the third camera 42C of the second group and the second camera 41B of the first group.

In an embodiment, the apparatus 1 (or the plurality of illuminators) includes a screen 55. The screen 55 is mounted on the head 36. The screen 55 may be mounted on the head removably. The screen 55 is configured to project the predetermined pattern (for example, a succession of parallel lines) on the surface of the piece of sanitaryware under inspection. Thus, the screen 55 defines a structured illuminator.

In the embodiment comprising the screen 55, the plurality of cameras also includes at least a first screen camera 43. The plurality of cameras may also include a second screen camera 44. The first screen camera 43 and, if present, the second screen camera 44, are configured to capture the light reflected by the surface of the piece of sanitaryware (this light being projected onto the surface of the piece of sanitaryware by the screen 55), in order to detect surface reflectivity defects by deflectometry analysis. The first screen camera 43 and the second screen camera 44 are preferably positioned on the edges of the screen (for example, on the top edge and on the bottom edge, or on the lateral edges), with convergent viewing axes.

Preferably, the cameras 41A, (41A'), 42A, (42A') of the first group have convergent viewing axes.

Preferably, the cameras 42A, 42B, 42C and 42D of the second group have convergent viewing axes.

Preferably, the central illuminator 51 and the lateral illuminators 52A, 52B, 52C, 53A, 53B, 53C have convergent illumination directions.

In an embodiment, the cameras 41A, (41A'), 42A, (42A') of the first group, the cameras 42A, 42B, 42C and 42D of the second group, the central illuminator 51 and the lateral illuminators 52A, 52B, 52C, 53A, 53B, 53C have convergent illumination directions (to converge on the surface or on a portion of the surface) of the piece of sanitaryware 6.

In an embodiment, the plurality of illuminators also includes a first illuminator 54A and a second illuminator 54B configured to emit a coloured light (red, for example). More specifically, the first illuminator 54A and the second illuminator 54B are configured to emit a flashing (or intermittent) light.

The apparatus 1 comprises a control unit 7.

In an embodiment, the control unit 7 is configured to receive input data representing a type (for example, brand and model) of the piece of sanitaryware 6 under inspection.

In an embodiment, the control unit 7 has access to a database 8, containing reference data 81. In an embodiment, the control unit 7 is configured to retrieve reference data 81. In an embodiment, the control unit 7 is configured to query the database as a function of the input data.

In an embodiment, the reference data 81 include one or more of the operating positions which the robotic arm 3 adopts in order to inspect the piece of sanitaryware 6.

The control unit 7 is configured to drive the rotary platform 22 (on which the piece of sanitaryware 6 rests) and the robotic arm 3 as a function of the reference data 81. More specifically, the control unit 7 is configured to drive one or more of the following actuators in coordinated fashion: rotation actuator 23 of the rotary platform 22, first actuator 371 of the robotic arm 3, second actuator 372 of the robotic arm 3, third actuator 373 of the robotic arm 3, fourth actuator 374 of the robotic arm 3, fifth actuator 375 of the robotic arm 3.

The control unit 7 is configured to enable one or more cameras of the first group of cameras 41A, (41A'), 41B, (41B') to capture images 4 (in an embodiment, three-dimensional images) of the piece of sanitaryware 6. In an embodiment, the control unit 7 is configured to drive the robotic arm 3 through a first sequence of operating positions at which the first group of cameras 41A, (41A'), 41B, (41N') captures images 4 of the piece of sanitaryware 6. In an embodiment, the first sequence of operating positions is predetermined. In an embodiment, the first sequence of operating positions is a function of the input data. In an embodiment, the control unit is configured to enable one or more illuminators of the plurality of illuminators 51, 52A, 52B, 52C, 53A, 53B, 53C.

In an embodiment, the control unit 7 is configured to reconstruct a three-dimensional rendering 70 of the piece of sanitaryware 6 from the three-dimensional images captured.

Figure 7A:
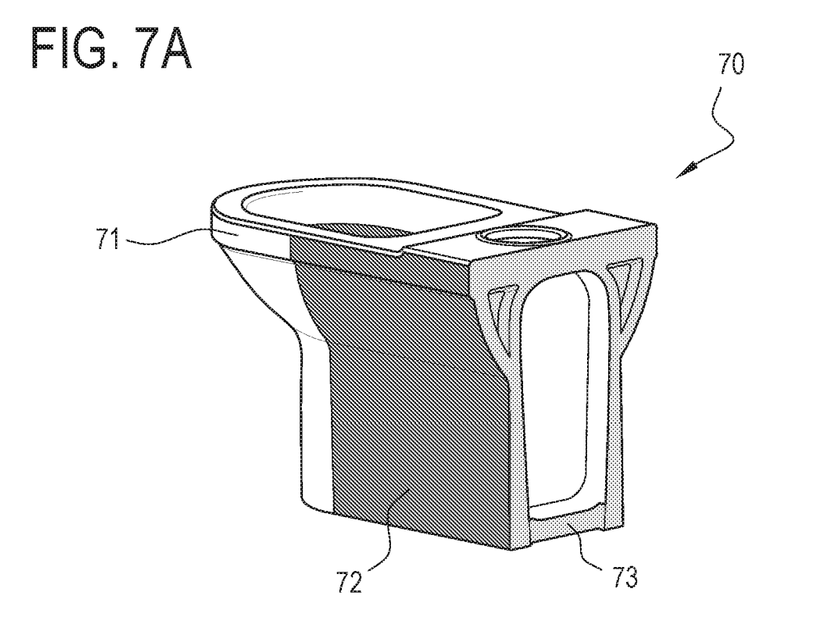
FIGS. 7A and 7B illustrate the piece of sanitaryware in respective three-dimensional renderings generated by the apparatus.
Figure 7B:
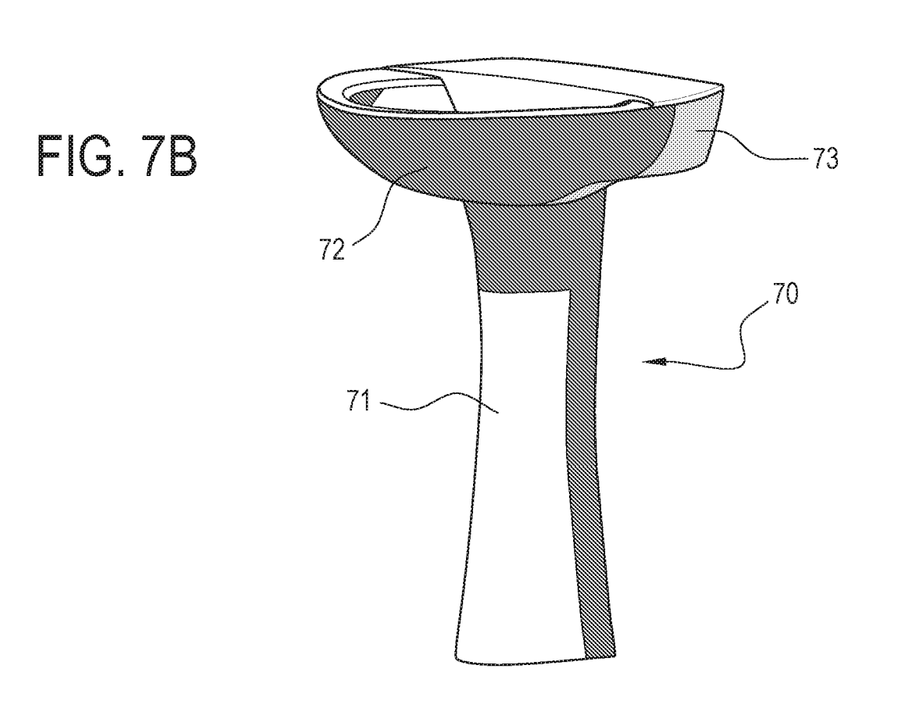
Figure 8:
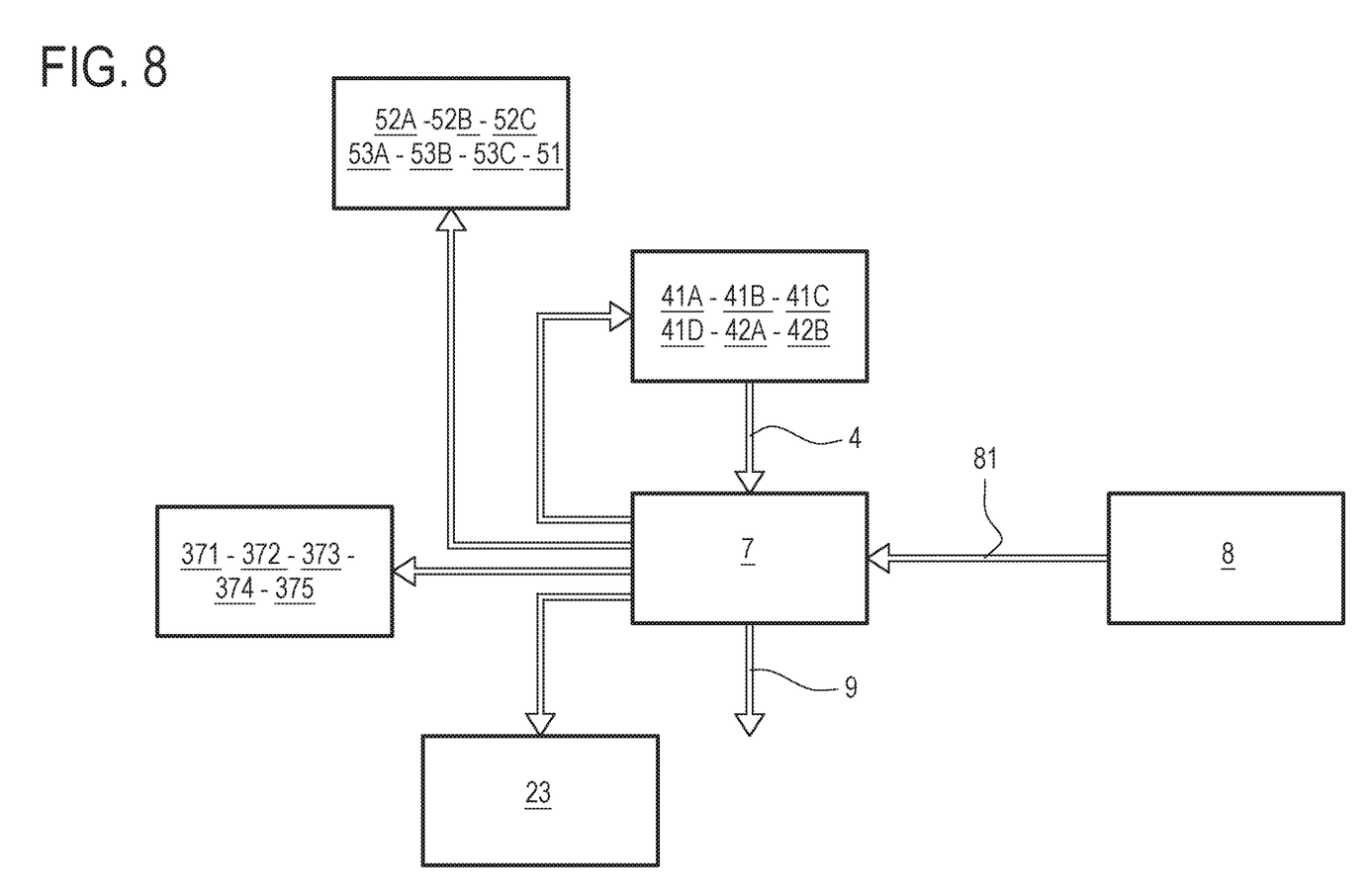
FIG. 8 schematically illustrates the operation of the apparatus of Figure

In an embodiment, the control unit 7 is configured to identify in the three-dimensional rendering 70 of the piece of sanitaryware 6 a visible zone 71, a half-hidden zone 72 and a hidden zone 73.

In an embodiment, the control unit 7 is configured to compare the three-dimensional rendering 70, and/or the captured images 4, with corresponding reference images (forming part of the reference data 81) to detect any differences between them (in the dimensions and/or in the surface). In an embodiment, the control unit 7 is configured to identify critical zones as a function of the comparison between the three-dimensional rendering 70, and/or the captured images 4, and the reference images as a function of reference tolerances (forming part of the reference data 81). More specifically, the control unit 7 is configured to extract image parameters from the three-dimensional rendering 70 and/or from the captured images 4, and to compare them with the reference image parameters (of reference images).

In an embodiment, the control unit 7 is configured to identify critical zones as a function of the comparison. A zone is said to be critical if at least one of the image parameters assessed during the comparison differs from the corresponding reference image parameter by a quantity greater than the reference tolerance.

In particular, any differences between the captured images 4 and/or the three-dimensional rendering 70 and the reference images are assessed with a first reference tolerance if they are located in the hidden zone 73, with a second reference tolerance if they are located in the half-hidden zone 72 and with a third reference tolerance if they are located in the visible zone 71. The first reference tolerance is greater than the second tolerance. The second reference tolerance is greater than the third tolerance.

In an embodiment, the control unit is configured to drive the robotic arm 3 through a second sequence of operating positions and, at each operating position of the second sequence of operating positions, to enable one or more cameras of the second group, of cameras 42A, 42B, 42C, 42D and one or more illuminators of the plurality of illuminators 51, 52A, 52B, 52C, 53A, 53B, 53C. The second sequence of operating positions is such that the second group of cameras 42A, 42B, 42C, 42D captures images 4 of one or more of the critical zones identified.

In an embodiment, the control unit 7 is configured to compare the images 4 captured by the second group of cameras 42A, 42B, 42C, 42D with reference data 81.

In an embodiment, the control unit 7 is configured to update the three-dimensional rendering 70 as a function of the images 4 captured by the second group of cameras 42A, 42B, 42C, 42D.

In an embodiment, the control unit 7 is configured to compare the updated three-dimensional rendering 70 with the reference data 81.

The control unit 7 is configured to provide diagnostic information 9 regarding the defectiveness of the piece of sanitaryware 6.

The apparatus 1 includes an interface configured to make the diagnostic information 9 available to a user.

In an embodiment, the diagnostic information 9 is defined by the updated three-dimensional rendering 70. In effect, by displaying the three-dimensional rendering 70 on the interface, the user can view the defects on the piece of sanitaryware 6.

In an embodiment, the diagnostic information includes graphical signs (for example, arrows or dots) to indicate the defects on the three-dimensional rendering 70. In an embodiment, the user interface then allows the user to view the defects in detail.

The invention claimed is:

1. An apparatus for optical inspection of sanitaryware comprising:
   a supporting device configured to receive a piece of sanitaryware to be inspected at an inspection position;
   at least one camera, configured to capture a plurality of images of the piece of sanitaryware under inspection at the inspection position;
   an automatic arm, movable between a plurality of operating positions relative to the supporting device, wherein the at least one camera is mounted on the automatic arm;
   a control unit, configured to receive the plurality of images captured by the at least one camera,
   wherein the control unit has access to a database containing reference data and is configured to process the plurality of images as a function of the reference data to provide diagnostic information regarding the defectiveness of the piece of sanitaryware,
   wherein said at least one camera comprises a retractable camera, movable between a retracted position, where it is housed in the head of the robotic arm, and an extracted position, where it projects from the head of the robotic arm.

2. The apparatus according to claim 1, wherein the automatic arm is a robotic arm including an operatively stationary base and an operatively movable head, wherein the at least one camera is mounted on the head.

3. The apparatus according to claim 1, comprising at least one illuminator, configured to illuminate the piece of sanitaryware under inspection at the inspection position, wherein the at least one illuminator is mounted on the head of the robotic arm.

4. The apparatus according to claim 1, comprising
   a plurality of cameras configured to capture the plurality of images, wherein the plurality of cameras includes at least a first group of cameras configured to capture three-dimensional images and a second group of cameras configured to capture two-dimensional images, wherein the cameras of the plurality of cameras are mounted on the head (36) of the robotic arm.

5. The apparatus according to claim 4, comprising a plurality of illuminators, configured to illuminate the piece of sanitaryware under inspection,
   wherein the illuminators of the plurality of illuminators are mounted on the head of the robotic arm.

6. The apparatus according to claim 5, wherein the plurality of illuminators includes a central illuminator and a first group and a second group of lateral illuminators, disposed on opposite sides of the head, wherein the cameras of the second group of cameras are positioned around the central illuminator and interposed between the first group and the second group of lateral illuminators, and wherein the first group and the second group of lateral illuminators are interposed between the cameras of the first group of cameras.

7. The apparatus according to claim 5, wherein the plurality of illuminators includes a structured illuminator, configured to project structured light on the piece of sanitaryware under inspection.

8. The apparatus according to claim 5, wherein the control unit is configured:
   to enable the first group of cameras to capture three-dimensional images of the piece of sanitaryware;
   to process the three-dimensional images captured by the first group of cameras;
   to selectively enable one or more cameras of the second group of cameras and one or more illuminators of the plurality of illuminators and/or to drive a movement of the robotic arm as a function of the three-dimensional images captured by the first group of cameras.

9. The apparatus according to claim 1, comprising an emitter associated with the automatic arm and configured to emit a wave directed at the piece of sanitaryware under inspection, wherein the control unit is configured to receive a signal representing a reflection of the wave on the piece of sanitaryware under inspection and to process the signal representing the reflection of the wave, in order to provide the diagnostic information.

10. The apparatus according to claim 1, wherein the control unit is configured to generate a three-dimensional rendering of the piece of sanitaryware under inspection as a function of the plurality of images captured.

11. The apparatus according to claim 1, wherein the reference data include a plurality of reference dimensions for the piece of sanitaryware under inspection, wherein the diagnostic information includes information relating to dimensional defectiveness and wherein the control unit is configured:
  to derive a plurality of real dimensions of the piece of sanitaryware under inspection from the plurality of images captured;
  to compare the plurality of real dimensions with corresponding reference dimensions of the plurality of reference dimensions;
  to derive the information relating to dimensional defectiveness as a function of a difference between the real dimensions and the reference dimensions.

12. The apparatus according to claim 1, wherein the reference data include, for the plurality of images captured, a corresponding plurality of reference images representing a reference piece of sanitaryware that is free of defects, wherein the diagnostic information includes information regarding surface defectiveness, and wherein the control unit is configured to compare one or more images of the plurality of images with the corresponding reference images of the plurality of reference images, and to derive the information regarding surface defectiveness as a function of the comparison between the captured images and the corresponding reference images.

13. The apparatus according to claim 1, wherein the supporting device includes a platform rotatable about a vertical axis of rotation and configured to supportably receive the piece of sanitaryware at the inspection position.

14. The apparatus according to claim 1, wherein the control unit is configured to receive input data representing a type of the piece of sanitaryware under inspection and to select the reference data from the database as a function of the input data, wherein the control unit is configured to drive the automatic arm through a predetermined succession of operating positions of the plurality of operating positions, as a function of the input data.

15. The apparatus according to claim 1, wherein the control unit is configured to receive an identification code to identify the piece of sanitaryware and to generate a report document including, for the piece of sanitaryware, the identification code of the piece of sanitaryware and the diagnostic information.

16. A method for optical inspection of sanitaryware, comprising the following steps:
  receiving a piece of sanitaryware to be inspected on a supporting device at an inspection position;
  moving an automatic arm between a plurality of operating positions;
  capturing a plurality of images of the piece of sanitaryware under inspection by means of at least one camera, the at least one camera being associated with the automatic arm;
  processing the plurality of images as a function of reference data to provide diagnostic information regarding the defectiveness of the piece of sanitaryware,
wherein the step of capturing includes a first sub-step of capturing three-dimensional images of the piece of sanitaryware and a second sub-step of capturing two-dimensional images of one or more zones of the piece of sanitaryware, wherein the method comprises, between the first sub-step and the second sub-step of capturing, a step of processing the three-dimensional images captured during the first sub-step, in order to identify the one or more zones of the piece of sanitaryware.

17. The method according to claim 16, comprising a step of rotating a rotary platform of the supporting device about a vertical axis of rotation, the rotation being coordinated with the movement of the automatic arm.

18. An apparatus for optical inspection of sanitaryware comprising:
  a supporting device configured to receive a piece of sanitaryware to be inspected at an inspection position;
  at least one camera, configured to capture a plurality of images of the piece of sanitaryware under inspection at the inspection position;
  an automatic arm, movable between a plurality of operating positions relative to the supporting device, wherein the at least one camera is mounted on the automatic arm;
  a control unit, configured to receive the plurality of images captured by the at least one camera,
wherein the control unit has access to a database containing reference data and is configured to process the plurality of images as a function of the reference data to provide diagnostic information regarding the defectiveness of the piece of sanitaryware,
wherein the reference data include a plurality of reference dimensions for the piece of sanitaryware under inspection, wherein the diagnostic information includes information relating to dimensional defectiveness and wherein the control unit is configured:
  to derive a plurality of real dimensions of the piece of sanitaryware under inspection from the plurality of images captured;
  to compare the plurality of real dimensions with corresponding reference dimensions of the plurality of reference dimensions;
  to derive the information relating to dimensional defectiveness as a function of a difference between the real dimensions and the reference dimensions.

19. An apparatus for optical inspection of sanitaryware comprising:
  a supporting device configured to receive a piece of sanitaryware to be inspected at an inspection position;
  at least one camera, configured to capture a plurality of images of the piece of sanitaryware under inspection at the inspection position;
  an automatic arm, movable between a plurality of operating positions relative to the supporting device, wherein the at least one camera is mounted on the automatic arm;
  a control unit, configured to receive the plurality of images captured by the at least one camera,
  wherein the control unit has access to a database containing reference data and is configured to process the plurality of images as a function of the reference data to provide diagnostic information regarding the defectiveness of the piece of sanitaryware,
wherein the apparatus comprises:
  a plurality of cameras configured to capture the plurality of images, wherein the plurality of cameras includes at least a first group of cameras configured to capture three-dimensional images and a second group of cameras configured to capture two-dimensional images, wherein the cameras of the plurality of cameras are mounted on the head of the robotic arm, a plurality of illuminators, configured to illuminate the piece of sanitaryware under inspection, wherein the illuminators of the plurality of illuminators are mounted on the head of the robotic arm, wherein the control unit is configured:

to enable the first group of cameras to capture three-dimensional images of the piece of sanitaryware;

to process the three-dimensional images captured by the first group of cameras;

to selectively enable one or more cameras of the second group of cameras and one or more illuminators of the plurality of illuminators and/or to drive a movement of the robotic arm as a function of the three-dimensional images captured by the first group of cameras.

* * * * *